US009594932B2

(12) United States Patent
Requist et al.

(10) Patent No.: US 9,594,932 B2
(45) Date of Patent: Mar. 14, 2017

(54) METHOD FOR CONNECTING A PORTABLE RFID READER TO A HANDHELD COMPUTING DEVICE VIA AN AUDIO CONNECTION

(71) Applicant: U Grok It, Inc., Steamboat Springs, CO (US)

(72) Inventors: Anthony M. Requist, Steamboat Springs, CO (US); Carolyn A. Requist, Steamboat Springs, CO (US)

(73) Assignee: U Grok It, Inc., Steamboat Springs ( * ) Notice: Subject to any disclaimer, the term of this patent is extended or adjusted under 35 U.S.C. 154(b) by 324 days.

(21) Appl. No.: 14/264,189

(22) Filed: Apr. 29, 2014

(65) Prior Publication Data

US 2014/0231519 A1    Aug. 21, 2014

Related U.S. Application Data

(63) Continuation of application No. 13/933,231, filed on Jul. 2, 2013.

(60) Provisional application No. 61/667,997, filed on Jul. 4, 2012.

(51) Int. Cl.
*G08B 23/00* (2006.01)
*G06K 7/10* (2006.01)
*G06Q 10/08* (2012.01)

(52) U.S. Cl.
CPC ..... *G06K 7/10009* (2013.01); *G06K 7/10386* (2013.01); *G06Q 10/08* (2013.01); *G06Q 10/087* (2013.01)

(58) Field of Classification Search
CPC .......... G06K 7/10009; G06K 7/10386; G06Q 10/08; G06Q 10/087
USPC ......................... 340/10.1–10.5, 572.1–572.9; 235/375–385
See application file for complete search history.

(56) References Cited

U.S. PATENT DOCUMENTS

| 6,232,870 | B1 | 5/2001 | Garber et al. |
| 6,448,886 | B2 | 9/2002 | Garber et al. |
| 6,717,516 | B2 | 4/2004 | Bridgelall |
| 7,002,473 | B2 | 2/2006 | Glick et al. |
| 7,034,684 | B2 | 4/2006 | Boman et al. |
| 7,118,037 | B2 | 10/2006 | Holloway et al. |
| 7,142,120 | B2 | 11/2006 | Charych et al. |
| 7,152,791 | B2 | 12/2006 | Chappidi et al. |
| 7,161,470 | B2 | 1/2007 | Berquist et al. |

(Continued)

*Primary Examiner* — Ojiako Nwugo
(74) *Attorney, Agent, or Firm* — Hamilton, DeSanctis & Cha LLP

(57) ABSTRACT

Methods and systems for efficiently communicating information to/from an RFID reader are provided. According to one embodiment, a command is received by a Radio-Frequency Identification (RFID) reader from a handheld computer via an audio connection of the handheld computer. Responsive to the command, a tag scanning process is initiated by the RFID reader to cause all RFID tags within range of the RFID reader to communicate their unique IDs to the RFID reader. A unique ID of an RFID tag is received by an RFID transceiver of the RFID reader. Responsive to receipt of the unique ID, the RFID reader: (i) assigns a short tag ID to the RFID tag and creates an entry in a table having stored therein the short tag ID and the unique ID; and (ii) reports detection of the RFID tag by transmitting to the handheld computer the short tag ID and the unique ID.

14 Claims, 7 Drawing Sheets

(56) References Cited

U.S. PATENT DOCUMENTS

| | | |
|---|---|---|
| 7,271,715 B2 | 9/2007 | Aupperle et al. |
| 7,378,968 B2 | 5/2008 | Wang et al. |
| 7,413,124 B2 | 8/2008 | Frank et al. |
| 7,420,465 B2 | 9/2008 | Ritter |
| 7,635,086 B2 | 12/2009 | Spencer, II |
| 7,696,875 B2 | 4/2010 | Wulff |
| 7,712,674 B1 | 5/2010 | Warner et al. |
| 7,728,732 B2 | 6/2010 | Garber et al. |
| 7,741,967 B2 | 6/2010 | Valeriano et al. |
| 7,762,470 B2 | 7/2010 | Finn et al. |
| 7,821,391 B2 | 10/2010 | Gupta et al. |
| 7,834,762 B2 | 11/2010 | Danvir et al. |
| 8,910,868 B1 * | 12/2014 | Wade ............... G06K 7/0095 235/449 |
| 2001/0008390 A1 | 7/2001 | Berquist et al. |
| 2006/0132308 A1 | 6/2006 | Stump et al. |
| 2007/0229264 A1 | 10/2007 | Eveland |
| 2008/0018455 A1 | 1/2008 | Kulakowski |
| 2009/0231135 A1 | 9/2009 | Chaves et al. |
| 2014/0009291 A1 | 1/2014 | Requist et al. |
| 2014/0206347 A1 * | 7/2014 | Shah ................. G08B 21/24 455/426.1 |

* cited by examiner

| Short tag # | EPC | numReads SinceSend | numReads DuringSend | First find? | Being sent? | Of interest? |
|---|---|---|---|---|---|---|
| 1 | 01 23 45 67 89 AB CD EF 01 23 45 67 | 0 | 0 | NO | NO | YES |
| 2 | 22 33 44 55 66 77 88 99 AA BB CC DD | 2 | 0 | NO | NO | YES |
| 3 | 01 10 02 20 03 30 04 40 05 50 06 60 | 2 | 1 | NO | YES | YES |
| 4 | 98 87 76 65 54 43 32 21 11 22 33 44 | 1 | 0 | YES | NO | YES |
| 5 | 3F FF FF FF FF FF FF FF 00 00 11 11 | 1 | 2 | YES | YES | YES |
| 6 | 32 32 32 32 43 43 43 43 54 54 54 54 | 0 | 0 | NO | NO | NO |

FIG. 4

| Short Tag ID | EPC | Number of Finds |
|---|---|---|
| 11 | 41 6C 65 78 61 20 77 88 99 AA BB CC | 1 |
| 12 | 4A 65 73 73 69 63 61 20 45 45 78 78 | 3 |
| 13 | 22 22 22 33 33 33 44 44 55 55 55 | 1 |

FIG. 5A

| Short tag ID | Number of finds |
|---|---|
| 4 | 5 |
| 7 | 3 |
| 9 | 2 |

FIG. 5B

| Short tag ID | Of interest? |
|---|---|
| 4 | YES |
| 7 | YES |
| 9 | NO |

FIG. 6

METHOD FOR CONNECTING A PORTABLE RFID READER TO A HANDHELD COMPUTING DEVICE VIA AN AUDIO CONNECTION

CROSS-REFERENCE TO RELATED APPLICATIONS

This application is a continuation of U.S. patent application Ser. No. 13/933,231, filed Jul. 2, 2013, which claims the benefit of U.S. Provisional Application No. 61/667,997, filed on Jul. 4, 2012, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2012-2014, U Grok It, Inc.

BACKGROUND

Field

Embodiments of the present invention relate generally to combining RFID technology and handheld computing devices. More particularly, embodiments of the present invention relate to using an audio connection of a handheld computer device to send data bi-directionally between an RFID reader the handheld computer device.

Description of the Related Art

RFID tags are small electronic devices that can store small amounts of data. This data can be read from an RFID reader at a distance of a few inches to 30 feet or more depending on the tags and the reader used. Each tag has an ID that uniquely identifies the tag. Typically this ID is 96 bits long, but it may be shorter or longer. A database is normally used to associate the ID with a specific item. When the RFID tag is later scanned by an RFID reader, the ID is used to identify the specific item, thereby enabling specific items to be tracked or located.

A handheld RFID reader normally either has a computer built-in or is attached to a handheld computer. The computer is used to control the operation of the RFID reader and to display results from the RFID reader and/or transmit results from the RFID reader to a server.

SUMMARY

Methods and systems are described for efficiently communicating information to/from an RFID reader are provided. According to one embodiment, a command is received by a Radio-Frequency Identification (RFID) reader from a handheld computer via an audio connection of the handheld computer. Responsive to the command, a tag scanning process is initiated by the RFID reader to cause all RFID tags within range of the RFID reader to communicate their unique IDs to the RFID reader. A unique ID of an RFID tag is received by an RFID transceiver of the RFID reader. Responsive to receipt of the unique ID, the RFID reader: (i) assigns a short tag ID to the RFID tag and creates an entry in a table having stored therein the short tag ID and the unique ID; and (ii) reports detection of the RFID tag by transmitting to the handheld computer the short tag ID and the unique ID.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 conceptually illustrates a table of tags maintained in an RFID reader during tag scan processing in accordance with an embodiment of the present invention.

FIGS. 5A and 5B conceptually illustrate data sent from an RFID reader to a handheld computer to report tag finds in accordance with an embodiment of the present invention.

FIG. 6 conceptually illustrates data sent from a handheld computer to an RFID reader in response to a report of initial tag finds in accordance with an embodiment of the present invention. The "of interest" flag tells the RFID reader whether or not this tag is of interest to the handheld computer.

DETAILED DESCRIPTION

Figure 1:
FIG. 1 illustrates an RFID reader connected to a handheld computer via an audio connection in accordance with an embodiment of the present invention.

Methods and systems are described for efficiently communicating information to/from an RFID reader. Embodiments of the present invention enable an RFID reader to connect with a handheld computer device, typically a smartphone or tablet computer, via an audio connection. The RFID reader is a device that uses RFID technology to scan for and find RFID tags in the surrounding area, typically at a distance of up to 30 feet. The handheld computer is used to control the operation of the RFID reader and to display results from the RFID reader and/or transmit results from the RFID reader to a server.

Often users are interested in a set of items, and whether all the items in the set are present or not. For instance, a traveler leaving a hotel wants to know that they have all of their luggage items packed in their luggage; a person leaving for the gym wants to know that their gym bag contains all of their gym items; and a service person leaving a work location wants to know that they have all of their tools in their tool box. In copending and commonly owned U.S. application Ser. No. 13/933,231 methods and systems are disclosed for facilitating creation of sets of tagged items and enabling users to quickly confirm whether all of the items in a set of tagged items are in physical proximity to a tag reader without having to visually verify the presence of the items. The methods and systems described herein may be used in conjunction with the sets functionality described in the aforementioned patent application or for other purposes.

The user attaches RFID tags (e.g., passive RFID tags/labels, active RFID tags/labels, battery-assisted passive RFID tags/labels, and the like) to each item desired to be tracked. A unique ID is given to each tag, and that ID is associated with the specific item to which it is attached via a database.

According to one embodiment, the user creates a list, via a user interface of a handheld computer system (e.g., a smartphone app), of one or more items (e.g., a set of related items and/or a list of unrelated items) that are desired to be located by an RFID reader. For example, the user may select individual items and/or one or more sets of related items from a list of previously tagged and registered items and/or sets displayed on a display screen of the handheld computer.

The user interface allows the user to cause the RFID reader to start scanning for tags using standard ultra-high frequency (UHF) RFID protocol and to log and/or report information relating to all finds or those finds identified to be of interest. For example, in one embodiment, a previously registered set of related tagged items (e.g., tagged items associated with Jessica's soccer bag (e.g., left cleat, right cleat, left shin guard, right shin guard, ball pump, etc.) or Alexa's cheer bag (e.g., top, skirt, pom #1, pom #2, bow, left shoe, right shoe, etc.)) and/or individual items of a list of previously registered tagged items may be identified by the end user as items of interest. As described further below, an optional list of items of interest may be communicated from the handheld computer to the RFID reader concurrently with a command to initiate tag scan processing. Alternatively, the handheld computer may cause the RFID reader to initiate tag scan processing without providing a list of items of interest. The tag scanning process, often called "inventory", causes all tags within range of the reader to communicate their unique IDs to the RFID reader.

According to embodiments of the present invention, an audio connection provided by the handheld computer is used to send data bi-directionally between the handheld computer and the RFID reader.

While the RFID reader is scanning for RFID tags, the RFID reader sends information to the handheld computer about the RFID tags it finds. According to one embodiment, in order to maximize the number of RFID tags that can be reported, this information is transmitted efficiently in a compressed/encoded form. Additionally or alternatively, the handheld computer may register interest in a list of RFID tags to prevent the RFID reader from reporting detection of RFID tags other than those on the list.

According to one embodiment, an RFID reader and a handheld computer are coupled in communication via an audio connection of the handheld computer. The audio connection is used to send digital data between the RFID reader and the handheld computer allowing the handheld computer to control the RFID reader and allowing the RFID reader to communicate results to the handheld computer. The RFID reader may compress information transmitted to the handheld computer by maintaining a table of RFID tags IDs found and, when the tag is subsequently found, referring to tags by a short form ID instead of the tag's full ID.

The RFID reader sends data packets to the handheld computer about RFID tag finds. When the RFID reader is ready to send a data packet, it may prioritize reporting of new tag IDs found over those previously found. If the RFID reader has multiple new tag IDs to report, several new tag IDs may be sent in one data packet. When new tag IDs are reported to the handheld computer, a short form ID representing the tag's full ID in compressed and/or encoded form (e.g., a one-byte ID, a two-byte ID or an ID otherwise represented in fewer bits than the tag's full ID) may be included. If the RFID reader has no new RFID tag IDs to report, it may report additional finds of previously reported tags. This can be done using the short form ID, instead of the tag's full ID to be more efficient. In one embodiment, the number of additional finds for each tag ID is sent instead of reporting each additional tag ID find individually. If the RFID reader has multiple tag IDs to report additional finds for, these may be combined into a single data packet.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

TERMINOLOGY

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "Radio-Frequency Identification" and the acronym "RFID" are used herein to broadly refer to any radio-frequency-based system for identifying objects at a distance, examples include, but are not limited to, UHF RFID (e.g., between 300 megahertz (MHz) and 3 gigahertz (Ghz), including the 433 MHz band, the 865 to 868 MHz band and the 905 to 925 MHz band.

FIG. 1 illustrates an RFID reader 110 connected to a handheld computer 100 via an audio connection 105 in accordance with an embodiment of the present invention. The audio connection 105 provided by handheld computer 100 (e.g., a smartphone) typically uses a 4-element "TRRS" connector and is normally used to connect handheld computer 100 to one or two speakers (a headset) and a microphone. In the context of the present example, RFID reader 110 has a TRRS audio plug 115 that plugs into a TRRS audio jack 105 of handheld computer 100.

Once RFID reader 110 and handheld computer 100 are attached in this way, a handshaking protocol may be used to initiate a connection between the two devices. After the connection is initiated, data may be sent bi-directionally by encoding bits over audio connection 105. Standard FSK encoding may be used to transmit bits, and standard packetization and network layering techniques are used to transmit packets of bytes across audio connection 105.

Figure 2:
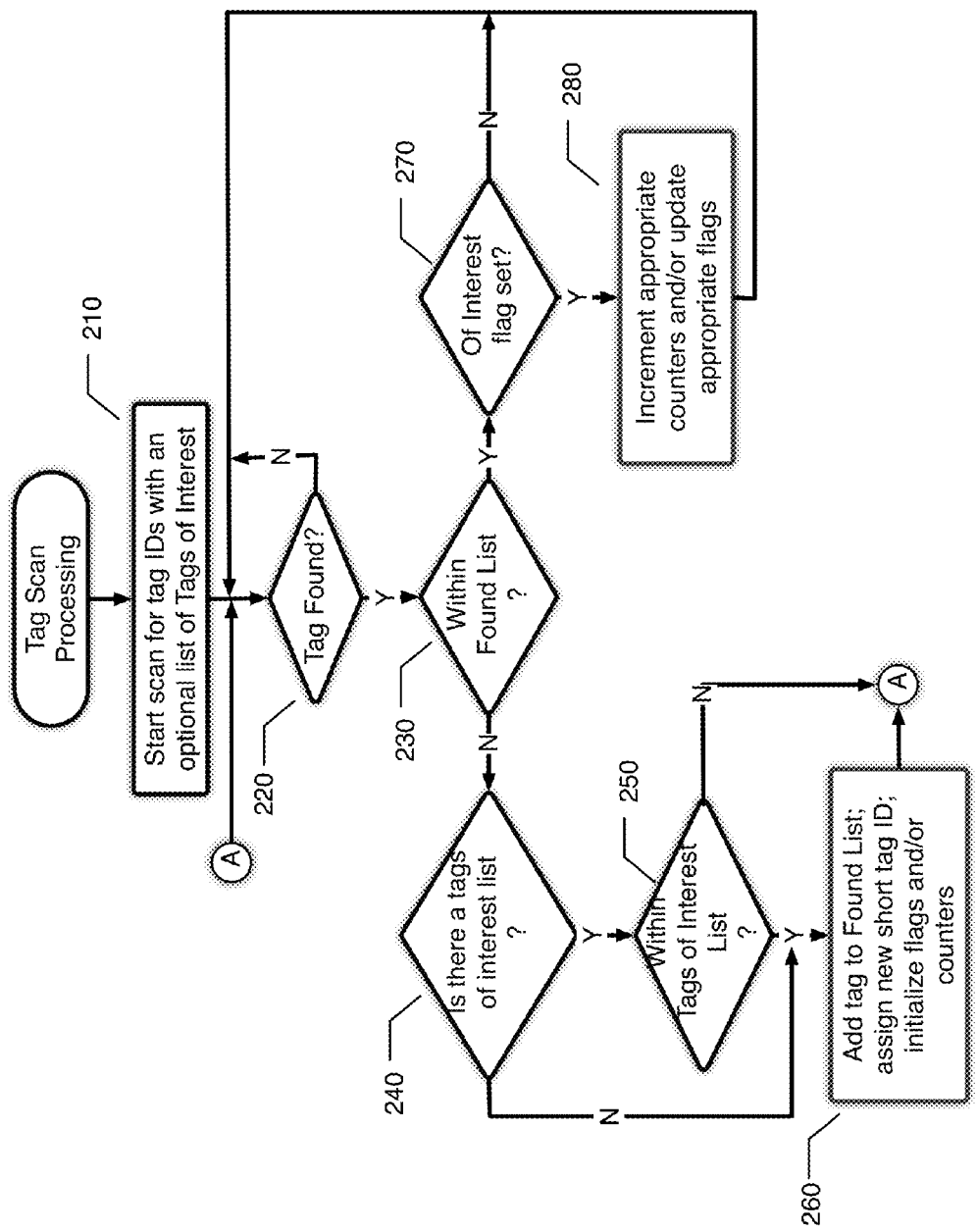
FIG. 2 is a high-level flow diagram illustrating how an RFID reader operates while scanning for tags in accordance with an embodiment of the present invention.

FIG. 2 is a high-level flow diagram illustrating how an RFID reader operates while scanning for tags in accordance with an embodiment of the present invention. In the context of the present example, the RFID reader performs tag logging (e.g., logging of data regarding found RFID tag IDs) while performing tag scan processing by updating a table of tags when tags are found. According to one embodiment, when the handheld computer commands the RFID reader to start scanning for RFID tags, the handheld computer may send a list of RFID tag IDs that it is interested in to the RFID reader. The reader then only reports tag IDs that are in this list, ignoring all other tag IDs.

In one embodiment, while the RFID reader is scanning for RFID tags, the RFID reader maintains a table in memory of the RFID tag IDs it has recently found. When a RFID tag ID is found, the reader first matches it against the IDs in the table. If the tag ID is not found, it is added to the table. If the table is full, the oldest tag ID may be removed and replaced with the new ID. According to the present example, in order to promote efficient communications between the RFID reader and the handheld computer, when an optional list of Tags of Interest is provided by the handheld computer, the RFID reader reports only finds of those tags in the list of Tags of Interest.

At block 210, the RFID reader receives a command from the handheld computer to start a scan for tag IDs. The command from the handheld computer may include an optional list of Tags of Interest. If so, this list of Tags of Interest may be stored in memory of the RFID reader. Responsive to receipt of the command, the RFID reader starts a tag scanning process that causes all tags within range of the RFID reader to transmit their unique IDs to the RFID reader.

At decision block 220, it is determined if a tag has been found. While depicted in what might appear to be a polling loop, those or ordinary skill in the art will appreciate the yes path of decision block 220 may be triggered responsive to a hardware or software interrupt representing detection by the RFID reader of a valid tag ID and the no path of decision block 220 may represent inactivity of tag scan processing. When a tag is found, processing continues with decision block 230.

At decision block 230, it is determined whether the tag found at decision block 220 has previously been found. In one embodiment, the RFID reader maintains a Found List containing information regarding recently found tags. An example of a Found List in the form of a table is discussed below with reference to FIG. 4. In the context of the present example, the Found List includes at least the tag IDs of tags recently found and additionally may include or otherwise be associated with a flag indicting whether the particular tag ID has been identified to be of interest to the user of the handheld computer. If upon searching the Found List, the tag ID of the tag being processed is not located, then this is the first time the tag has been found since the tag scanning process was initiated or since the tag has otherwise been removed from the Found List, for example, as a result of the Found List being full and processing continues with decision block 240. If, however, the tag is located in the Found List, then this represents a second or subsequent find of the tag and processing branches to decision block 240 and processing continues with decision block 270.

At decision block 240, a determination is made as to whether there exists a tags of interest list. This tags of interest list may represent provision of the optional list of Tags of Interest by the handheld computer concurrently with the command to commence tag scan processing. Alternatively, the optional list of Tags of Interest may be provided by the handheld computer independently of the command to commence tag scan processing. Further still, according to one embodiment, when the RFID reader reports detection of a tag to the handheld computer (e.g., an initial find or a subsequent find), a response may be received from the handheld computer indicating whether or not the handheld computer is or remains interested in receiving an alert or report when the RFID reader subsequently detects the tag. If there is a tags of interest list, the processing continues with decision block 250; otherwise, processing branches to block 260.

At block 250, a determination is made regarding whether the tag at issue is within the tags of interest list. If so, then processing continues with block 260; otherwise processing loops back to decision block 220.

At block 260, the tag at issue is assigned a new short tag ID, added to the Found List and any flags and/or counters in the Found List may be initialized accordingly. Non-limiting examples of flags and counters that may be maintained within the Found List are described with reference to FIG. 4. For example, if a first find flag is maintained for the found tags, it can be initialized to "true" or "yes" for the tag at issue as this process path is associated with a first find. Similarly, if an of interest flag is maintained for the found tags, it can be initialized to "true" or "yes" for the tag at issue as this process path is taken only for tags that have been determined to be of interest to the end user of the handheld computer. After block 260, processing loops back to decision block 220.

At decision block 270, it is determined whether a corresponding of interest flag is set for the tag at issue. According to one embodiment, the of interest flag is set based on the optional list of Tags of Interest provided concurrently with the command from the handheld computer to initiate the scan for tags at block 210. The of interest flag may be maintained as part of the Found List as described with reference to FIG. 4. If the tag at issue is deemed to be of interest to the end user of the handheld computer based on the corresponding of interest flag, then processing continues with block 280; otherwise, processing loops back to decision block 220.

At block 280, appropriate counters and/or flags associated with the tag at issue are incremented/updated. For example, if a first find flag is maintained for the found tags, it can be initialized to "false" or "no" for the tag at issue as this process path is associated with a second or subsequent find.

Figure 3:
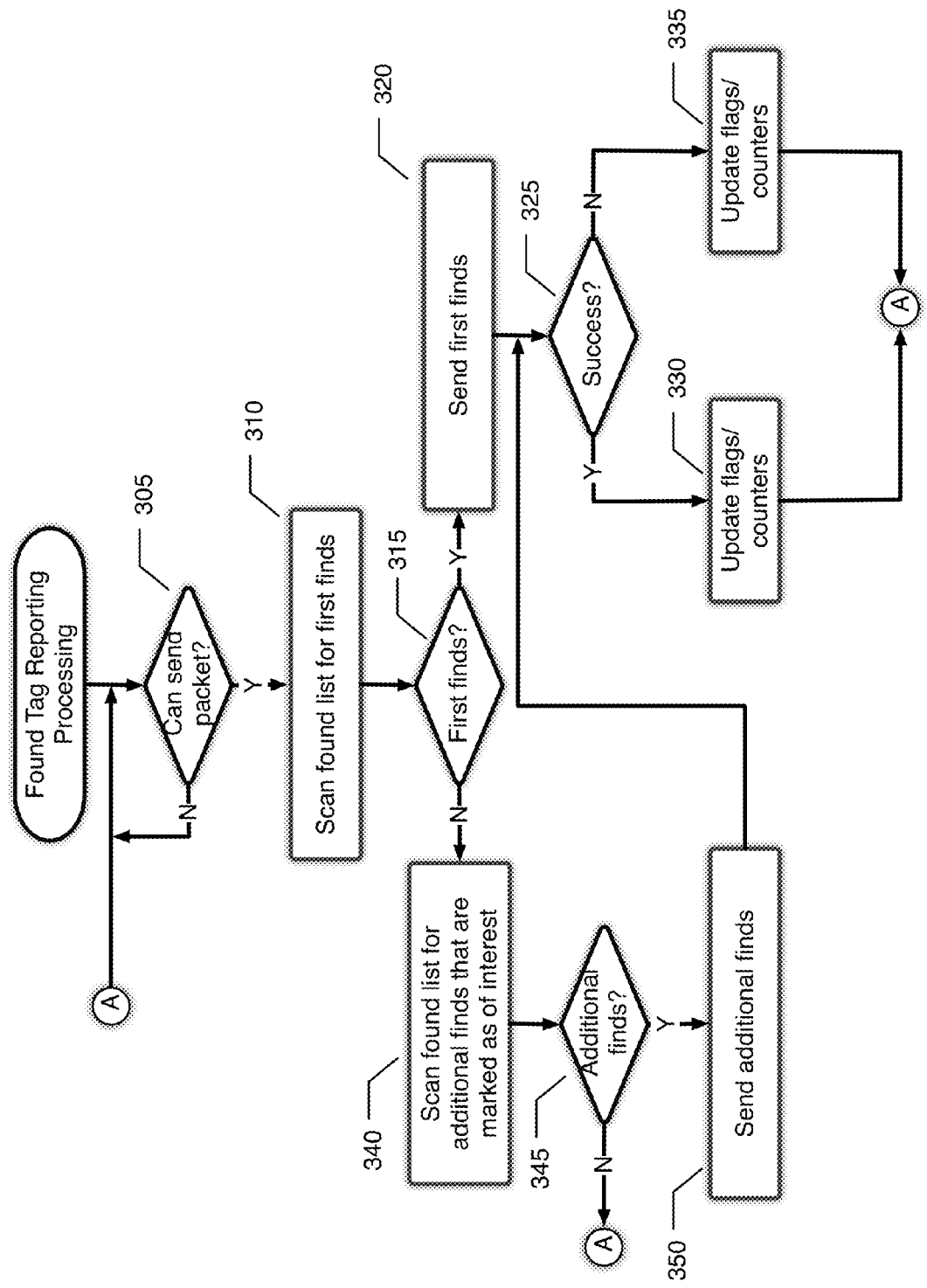
FIG. 3 is a high-level flow diagram illustrating how the RFID reader performs found tag reporting processing in accordance with an embodiment of the present invention.

FIG. 3 is a high-level flow diagram illustrating how the RFID reader performs found tag reporting processing in accordance with an embodiment of the present invention. This flow diagram shows how the RFID reader determines what data to send to the handheld computer, illustrating how the RFID reader may prioritize initial tag finds over subsequent tag finds. According to one embodiment this flow diagram may represent a concurrent task operated in parallel with the processing described above with reference to FIG. 3.

At decision block 305, a determination is made regarding whether the RFID reader can send a packet. This determination may be based on, among other factors, the existence or non-existence of current communication activity on the audio connection of the handheld computer. Those of ordinary skill in the art will appreciate other factors may also affect the determination. For example, the communication channel could be disabled or otherwise unavailable. If the RFID reader has the ability to send a packet to the handheld computer, then processing continues with block 310; otherwise, the RFID reader waits until it has the ability to send a packet. As above, while depicted in what might appear to be a polling loop, those or ordinary skill in the art will appreciate the yes path of decision block 305 may be triggered responsive to a hardware or software interrupt representing a lack of communication activity on the audio connection and the no path of decision block 305 may represent inactivity of found tag reporting processing.

At block 310, the Found List is scanned to identify the existence of tags found for the first time. According to one embodiment, this is done by maintaining a table such as that illustrated by FIG. 4 that includes a first find flag indicating whether the corresponding tag represents a tag that has been found for the first time.

At decision block 315, it is determined whether there exist any tags in the Found List that are first finds. In one embodiment, this determination is made with reference to a first find flag. If one or more tags are identified as first finds, the processing continues with block 320; otherwise, processing branches to block 340.

At block 320, an attempt is made to send the first finds to the handheld computer. A non-limiting example of information included in a first find communication is described below with reference to FIG. 5A. In one embodiment, at a minimum, the unique tag IDs of those of the first finds are reported to the handheld computer. In other embodiments, corresponding short tag IDs are also provided to the handheld computer to reduce communication overhead in connection with subsequent communications relating to the first finds. In yet another embodiment, a corresponding number of finds counter is also provided to the handheld computer for each of the first finds (some of which may have been found one or more additional times prior to the reporting cycle). In an embodiment in which a flag is maintained for each tag indicating whether the tag is in the process of being sent to the handheld device, this flag may at this time be set as "true" or "yes."

At decision block 325, a determination is made regarding the success of the reporting to the handheld computer. In one embodiment, success is determined based upon a positive acknowledgement being received from the handheld computer within a predetermined or configurable timeframe. If the reporting to the handheld computer was successful, then processing continues with block 330; otherwise, processing branches to block 335.

At block 330, reporting of first finds from the RFID reader to the handheld device has been found to have been successful, therefore appropriate flags and/or counters maintained in the Found List or a table of tags are updated accordingly. For example, if a being sent flag is maintained by the RFID reader, then this flag may be cleared (e.g., reset to "false" or "no") for each of the tags just successfully reported. Additionally, if a first find flag is maintained by the RFID reader, then this flag may also be cleared (e.g., reset to "false" or "no") for each of the tags just successfully reported. Finally, if counters are maintained to track how many times tags are read during the reporting process (e.g., a numReadsDuringSend counter) and since the last reporting cycle (e.g., a numReadsSinceSend counter), then numReadsSinceSend is set equal to numReadsDuringSend as any detections of the reported tags during the reporting process have yet to be reported to the handheld computer.

At block 335, reporting of first finds from the RFID reader to the handheld device has been found to have been unsuccessful, therefore appropriate flags and/or counters maintained in the Found List or a table of tags are updated accordingly. For example, if a being sent flag is maintained by the RFID reader, then this flag may be cleared (e.g., reset to "false" or "no") for each of the tags unsuccessfully reported. Additionally, if counters are maintained to track how many times tags are read during the reporting process (e.g., a numReadsDuringSend counter) and since the last reporting cycle (e.g., a numReadsSinceSend counter), then numReadsSinceSend is set to the current value of numReadsSinceSend plus the current value of numReadsDuringSend as any detections of the intended to be reported tags during the unsuccessful reporting process have yet to be reported to the handheld computer as well as any detections during the reporting process for previously successfully reported tags.

At block 340, it has previously been determined at decision block 315 that no first finds exist in the Found List to be reported to the handheld device. As such, the Found List is scanned for additional finds that are marked as of interest.

At decision block 345, it is determined whether the scan of block 340 identified the existence of any tags in the Found List that have been found a second or subsequent time that also are marked as of interest. In one embodiment, this determination is made with reference to the numReadsSinceSend counter and the of interest flag. If one or more tags have a corresponding numReadsSinceSend counter value of greater than zero and an of interest flag that is set (e.g., "true" or "yes"), then, processing continues with block 350; otherwise, processing branches back to decision block 305.

At block 350, an attempt is made to send the additional finds to the handheld computer. A non-limiting example of information included in an additional find communication is described below with reference to FIG. 5B. In one embodiment, at a minimum, the short tag ID of those of the additional finds are reported to the handheld computer. In other embodiments, corresponding number of finds counter values (e.g., numReadsSinceSend) are also provided to the handheld computer. After block 350, processing continues with decision block 325 to determine whether the reporting of additional finds to the handheld computer was successful.

FIG. 4 conceptually illustrates a table of tags 400 maintained in an RFID reader during tag scan processing in accordance with an embodiment of the present invention. According to one embodiment, the first time the RFID reader receives a unique ID (e.g., representing an Electronic Product Code (EPC) 420) of a particular RFID tag, it registers the tag as one of those found by the RFID reader by assigning a short tag number 410 to the EPC and creating an entry in table of found tags 400. During subsequent finds of a tag, various counters and flags can be updated within the table of found tags maintained by the RFID reader. Examples of potential counters include (i) a counter (e.g., numReadsSinceSend 430) maintained for each tag to track the number of times the tag was found since a last report of found tags was communicated to the handheld device; and (ii) a counter (e.g., numReadsDuringSend 440) maintained for each tag to track the number of times the tag was found during transmission of a report of found tags to the handheld device. Examples of potential flags that might be maintained on a per tag basis include a flag (e.g., first find 450) indicating whether it is the first time a particular tag has been found and a flag (e.g., being sent 460) indicating whether the tag is among those currently in the process of being reported to the handheld computer and a flag (e.g., of interest 470) indicating whether the tag has been identified by the handheld computer as a tag of interest.

According to one embodiment, when the RFID reader reports a new tag ID to the handheld computer, the handheld computer's response includes a binary (true or false) value indicating whether or not the handheld computer is interested in this tag ID. In embodiments using an optional list of Tags of Interest provided by the handheld computer, the RFID reader only reports additional finds of tags marked as being of interest to the handheld computer.

In the present example, row 401 includes a tag that has been sent to the handheld computer, has not been scanned since last being reported to the handheld computer, which is currently of interest to the handheld computer and which has been assigned a corresponding short tag ID of 1. Row 402 relates to a tag that has been sent to the handheld computer, has been scanned twice since last being sent to the handheld computer, which is currently of interest to the handheld computer and which has been assigned a corresponding short tag ID of 2. Row 403 relates to a tag that has been sent to the handheld computer and is being sent to the handheld computer again with numReadsSinceSend=2, has been scanned once since the send started, which is currently of interest to the handheld computer and which has been assigned a corresponding short tag ID of 3. Row 404 relates to a first find tag that has not been sent to the handheld computer, has been scanned once, which is of interest to the handheld computer and which has been assigned a corresponding short tag ID of 4. Row 405 relates to a first find tag that has not been sent to the handheld computer, is being sent to the handheld computer now, has been scanned twice since the send started, which is of interest to the handheld computer and which has been assigned a corresponding short tag ID of 5. Row 406 relates to a tag that is not of interest to the handheld computer.

FIGS. 5A and 5B conceptually illustrate data sent from the RFID reader to the handheld computer to report tag finds in accordance with an embodiment of the present invention. FIG. 5A illustrates the data sent to report one or more initial tag finds in accordance with an embodiment of the present invention.

In the context of the present example, each first find tag reported by the RFID reader includes a short tag ID 510, an EPC value 520 and number of finds 530. According to one embodiment short tag ID 510 is a one-byte value assigned to a tag that will be used by the RFID reader to report subsequent finds of the corresponding tag. In the present example, EPC value 520 represents a unique 96-bit value stored in a memory of the tag. In one embodiment, number of finds 530 represents a count of the number of times the corresponding tag has been found by the RFID reader prior to being successfully reported to the handheld computer.

In one embodiment, a single tag is reported at a time (e.g., row 511) to handheld computer. In other embodiments, multiple tags may be reported together (e.g., rows 511, 512 and 513).

FIG. 5B illustrates the data sent to report one or more subsequent finds of tags that have been previously reported. In the context of the present example, each subsequent find tag reported by the RFID reader includes a short tag ID 540 and a number of finds 550. According to one embodiment short tag ID 540 is the one-byte value assigned to the corresponding tag prior to reporting the first find of such tag. In one embodiment, number of finds 530 represents a count of the number of times the corresponding tag has been found by the RFID reader since a find of tis tag was last successfully reported to the handheld computer.

In one embodiment, a single tag is reported at a time (e.g., row 504) to handheld computer. In other embodiments, multiple tags may be reported together (e.g., rows 504, 507 and 509).

Figure 6:
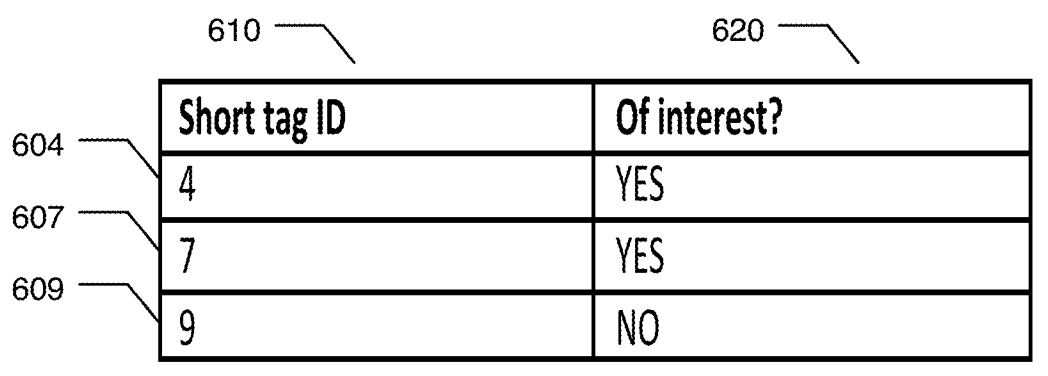

FIG. 6 conceptually illustrates data sent from a handheld computer to an RFID reader in response to a report of initial tag finds in accordance with an embodiment of the present invention. According to one embodiment short tag ID 610 is the one-byte value previously reported to the handheld computer by the RFID reader concurrently with the first find of the corresponding tag. In one embodiment, the "of interest" flag 620 tells the RFID reader whether or not the corresponding tag is of interest to the handheld computer.

In one embodiment, data regarding a single tag (e.g., row 604) is communicated by the handheld computer at a time to the RFID reader. In other embodiments, data regarding multiple tags (e.g., rows 604, 607 and 609) may be communicated together.

Figure 7:
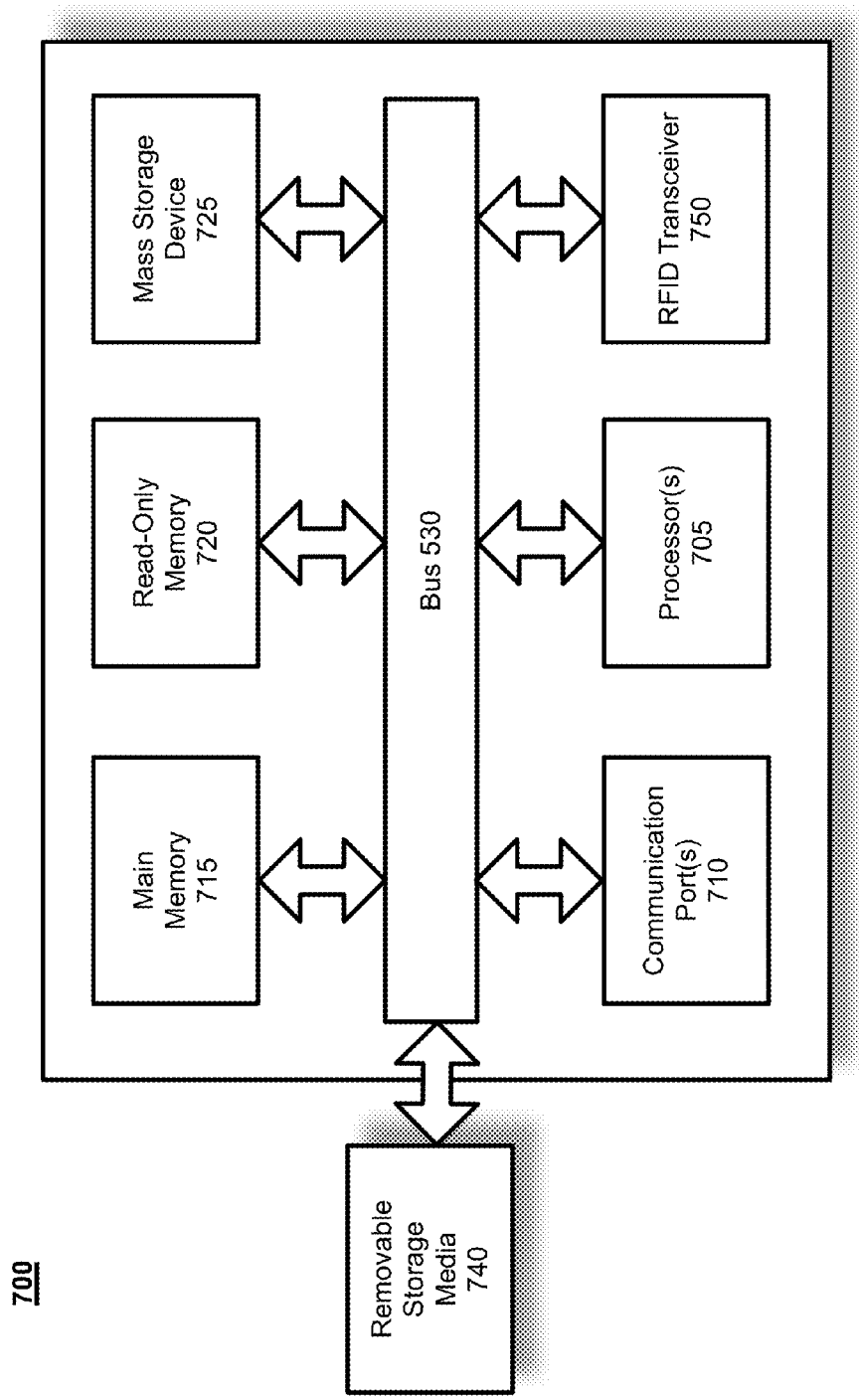
FIG. 7 is an example of a computer system with which embodiments of the present invention may be utilized.

Embodiments of the present invention include various steps, which have been described above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 representing a potential architecture of an RFID reader.

According to the present example, the computer system includes a bus 730, at least one processor 705, at least one communication port 710, a main memory 715, a removable storage media 740 a read only memory 720, and a mass storage 725.

Processor(s) 705 can be any known processor, such as, but not limited to, mobile application processors or other processors designed for portable devices, such as the ARM Cortex™-A7, -A8 or A9 processor of ARM Holdings, one or more of Texas Instruments' OMAP family of processors (e.g., the OMAP2430 or the OMAPV2230), an Intel® 80386 processor, and Intel PXA901 processor, an Intel Itanium® or Itanium 2 processor(s), or AMD® Opteron® or Athlon MP® processor(s), or Motorola® lines of processors. Notably, future mobile devices are likely to have at least two processors, one for carrier processing and one for application processing.

Among other things, processor(s) 705 is generally responsible for executing various operational instructions maintained in main memory 715, and processing and otherwise interacting with various other input/output (I/O) devices, such as internal and/or external context data sources. In one embodiment of the present invention, processor(s) 705 may receive interrupts from an integrated or externally connected RFID reader. Such interrupts may be received, for example, whenever the RFID reader detects a unique ID of an RFID tag. Such interrupts may be received using any interrupt scheme known in the art including, but not limited to, using a polling scheme where processor(s) 705 periodically reviews an interrupt register, or using an asynchronous interrupt port of processor 705. Alternatively or additionally, the processor(s) 705 may proactively request data from RFID reader on a periodic or as needed basis. Based on the disclosure provided herein, one of ordinary skill in the art will recognize a variety of interrupt and/or polling mechanisms that may be used in relation to different embodiments of the present invention.

Communication port(s) 710 represent physical and/or logical ports. For example communication port(s) may be any of a TRRS audio port to which TRRS audio plug 115 connects, an RS-232 port for use with a modem based dialup connection, a 10/100 Ethernet port, or a Gigabit port using copper or fiber. Communication port(s) 710 may be chosen depending on a network such a Local Area Network (LAN), Wide Area Network (WAN), or any network to which the computer system 700 connects.

Communication port(s) 710 may also be the name of the end of a logical connection (e.g., a Transmission Control Protocol (TCP) and/or User Datagram Protocol (UDP) port). For example communication ports may be one of the Well Know Ports, such as TCP port 80 (used for HTTP service), assigned by the Internet Assigned Numbers Authority (IRNA) for specific uses.

Main memory 715 can be Random Access Memory (RAM), or any other dynamic storage device(s) commonly known in the art. Read only memory 720 can be any static storage device(s) such as Programmable Read Only Memory (PROM) chips for storing static information such as instructions for processor 705.

Mass storage 725 can be used to store information and instructions. For example, hard disks such as the Adaptec® family of SCSI drives, an optical disc, an array of disks such as RAID, such as the Adaptec family of RAID drives, or any other mass storage devices may be used.

Bus 730 communicatively couples processor(s) 705 with the other memory, storage and communication blocks. Bus 730 can be a PCI/PCI-X or SCSI based system bus depending on the storage devices used.

Removable storage media 740 can be any kind of external hard-drives, floppy drives, IOMEGA® Zip Drives, Compact Disc-Read Only Memory (CD-ROM), MultiMedia Cards (MMCs), secure digital (SD) cards, such as miniSD and microSD cards, Compact Disc-Re-Writable (CD-RW), Digital Video Disk-Read Only Memory (DVD-ROM).

RFID transceiver 750 includes an RFID antenna to send a signal to RFID tags within range and an RFID sensor to sense/read the RFID tag responses.

The components described above are meant to exemplify some types of possibilities. In no way should the aforementioned examples limit the scope of the invention, as they are only exemplary embodiments.

What is claimed is:

1. A method comprising:
    maintaining, by a Radio-Frequency Identification (RFID) reader, a table of RFID tags detected by the RFID reader, wherein the table includes for each RFID tag of the RFID tags detected a corresponding unique ID of the RFID tag and a corresponding short tag ID assigned to the RFID tag;
    receiving, by the RFID reader, a command from a handheld computer via an audio connection of the handheld computer;
    responsive to the command, the RFID reader initiating a tag scanning process to cause all RFID tags within range of the RFID reader to communicate their unique Identifiers (IDs) to the RFID reader;
    receiving, by an RFID transceiver of the RFID reader, a unique ID of an RFID tag;
    responsive to receipt of the unique ID, the RFID reader:
        assigning a short tag ID to the RFID tag and creating an entry in the table having stored therein the short tag ID and the unique ID; and
        reporting detection of the RFID tag by the RFID reader by transmitting to the handheld computer the short tag ID and the unique ID; and
    when the RFID tag is subsequently detected by the RFID transceiver, compressing, by the RFID reader, information transmitted to the handheld computer by transmitting to the handheld computer the short tag ID without also transmitting the unique ID.

2. The method of claim 1, further comprising prioritizing, by the RFID reader, reporting of initial finds of the detected RFID tags ahead of reporting of subsequent finds of the detected RFID tags.

3. The method of claim 1, further comprising:
    receiving, by the RFID reader, from the handheld computer a list of tag IDs in which the handheld computer is interested; and
    reporting, by the RFID reader to the handheld computer, a subsequent find of an RFID tag of the RFID tags detected only if the RFID tag is identified in the list of tag IDs.

4. The method of claim 1, further comprising responsive to transmitting, by the RFID reader, a first tag find to the handheld computer for the RFID tag, receiving from the handheld computer a value indicating whether subsequent finds of the RFID tag should be reported or not.

5. A system comprising:
a Radio-Frequency Identification (RFID) reader;
a handheld computer including an audio port through which the RFID reader is coupled in communication with the handheld computer, wherein the audio port is used to send digital data between the RFID reader and the handheld computer allowing the handheld computer to control the RFID reader and allowing the RFID reader to communicate results to the handheld computer; and
wherein the RFID reader compresses information transmitted to the handheld computer by maintaining a table of RFID tags IDs for each of a plurality of RFID tags that have been found by the RFID reader and, when a tag of the plurality of RFID tags is subsequently found, referring to the tag by a short form Identifier (ID) instead of a full 96-bit ID.

6. The system of claim 5, wherein the RFID reader compresses information transmitted to the handheld computer when one or more tags of a plurality of RFID tags are found multiple times by the RFID reader by combining reporting of subsequent finds of the one or more tags after successfully reporting an initial find of the one or more tags.

7. The system of claim 5, wherein the RFID reader prioritizes reporting of initial finds of a tag of the plurality of RFID tags ahead of reporting of subsequent finds of the tag.

8. The system of claim 5, wherein the handheld computer transmits a list of tag IDs it is interested in to the RFID reader and responsive thereto the RFID reader only reports finds of tags in the list of tag IDs, ignoring finds of any other tags.

9. The system of claim 5, wherein when the RFID reader transmits a first tag find to the handheld computer for an RFID tag, the handheld computer responds with a value indicating whether subsequent finds of the RFID tag should be reported or not.

10. The system of claim 5, wherein the handheld computer comprises a smartphone.

11. A non-transitory computer-readable storage medium having stored therein a set of instructions, which when executed by one or more processors of a Radio-Frequency Identification (RFID) reader, cause the one or more processors to perform a method comprising:
maintaining a table of RFID tags detected by the RFID reader, wherein the table includes for each RFID tag of the RFID tags detected a corresponding unique ID of the RFID tag and a corresponding short tag ID assigned to the RFID tag;
receiving a command from a handheld computer via an audio connection of the handheld computer;
responsive to the command, initiating a tag scanning process to cause all RFID tags within range of the RFID reader to communicate their unique Identifiers (IDs) to the RFID reader;
receiving a unique ID of an RFID tag;
responsive to receipt of the unique ID:
assigning a short tag ID to the RFID tag and creating an entry in the table having stored therein the short tag ID and the unique ID; and
reporting detection of the RFID tag by transmitting to the handheld computer the short tag ID and the unique ID; and
when the RFID tag is subsequently detected by the RFID reader, compressing information transmitted to the handheld computer by transmitting to the handheld computer the short tag ID without also transmitting the unique ID.

12. The non-transitory computer-readable storage medium of claim 11, wherein the method further comprises prioritizing reporting of initial finds of the detected RFID tags ahead of reporting of subsequent finds of the detected RFID tags.

13. The non-transitory computer-readable storage medium of claim 11, wherein the method further comprises:
receiving from the handheld computer a list of tag IDs in which the handheld computer is interested; and
reporting to the handheld computer a subsequent find of an RFID tag of the RFID tags detected only if the RFID tag is identified in the list of tag IDs.

14. The non-transitory computer-readable storage medium of claim 11, wherein the method further comprises responsive to transmitting a first tag find to the handheld computer for the RFID tag, receiving from the handheld computer a value indicating whether subsequent finds of the RFID tag should be reported or not.

* * * * *